US009326614B2

(12) United States Patent
Suzuki et al.

(10) Patent No.: US 9,326,614 B2
(45) Date of Patent: *May 3, 2016

(54) LUMBAR SUPPORT APPARATUS

(75) Inventors: Hiromitsu Suzuki, Fujisawa (JP);
Yoichi Takada, Fujisawa (JP)

(73) Assignee: SHIROKI CORPORATION,
Fujisawa-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/344,559

(22) PCT Filed: Sep. 12, 2012

(86) PCT No.: PCT/JP2012/073260
§ 371 (c)(1),
(2), (4) Date: Mar. 12, 2014

(87) PCT Pub. No.: WO2013/039084
PCT Pub. Date: Mar. 21, 2013

(65) Prior Publication Data
US 2014/0346827 A1    Nov. 27, 2014

(30) Foreign Application Priority Data
Sep. 14, 2011  (JP) ................. 2011-200100

(51) Int. Cl.
*A47C 7/46*    (2006.01)
*B60N 2/66*    (2006.01)
(Continued)

(52) U.S. Cl.
CPC ............. *A47C 7/462* (2013.01); *A47C 7/402* (2013.01); *B60N 2/66* (2013.01); *B60N 2002/024* (2013.01); *B60N 2002/0236* (2013.01)

(58) Field of Classification Search
CPC .......... A47C 7/402; A47C 7/462; B60N 2/60; B60N 2002/0236; B60N 2002/024
USPC ..................................................... 297/284.7
See application file for complete search history.

(56) References Cited

U.S. PATENT DOCUMENTS 5,397,164 A *  3/1995  Schuster et al. ............ 297/284.1
6,520,580 B1 *  2/2003  Hong .......................... 297/284.4
(Continued)

FOREIGN PATENT DOCUMENTS

CN    101951812 A    1/2011
CN    201833914 U    5/2011
(Continued)

OTHER PUBLICATIONS

Chinese Office Action dated Aug. 5, 2015 with English translation.
(Continued)

*Primary Examiner* — Patrick Maestri
(74) *Attorney, Agent, or Firm* — McGinn IP Law Group, PLLC.

(57) ABSTRACT

A lumbar support apparatus includes a curved plate which is provided to a seat-back frame so that the upper part of the curved plate is rotatable in the vertical direction, and which is deformable in the direction in which a seated person's lumbar spine is pressed; a curved-plate deformation-amount adjustment unit including a threaded rod having an external thread formed on the peripheral surface thereof, and a nut member that is threadedly engaged with the external thread of the threaded rod and is attached to the lower part of the curved plate so as to be prohibited from rotating about a center axis and so as to be movable in the vertical direction; and a drive unit for rotatingly driving the threaded rod.

7 Claims, 10 Drawing Sheets

(51) Int. Cl.
   *A47C 7/40* (2006.01)
   *B60N 2/02* (2006.01)

(56) References Cited

U.S. PATENT DOCUMENTS

| | | | |
|---|---|---|---|
| 6,692,074 B1 | 2/2004 | Kopetzky et al. | |
| 7,007,568 B2 * | 3/2006 | MacAulay et al. | 74/501.6 |
| 7,270,374 B2 * | 9/2007 | Moriggi | 297/284.4 |
| 8,091,967 B2 * | 1/2012 | Schweizer et al. | 297/284.8 |
| 8,454,090 B2 * | 6/2013 | Colja et al. | 297/284.4 |
| 9,193,288 B2 * | 11/2015 | Suzuki | B60N 2/66 |
| 2004/0075319 A1 * | 4/2004 | VanSickle | 297/284.4 |
| 2004/0104609 A1 | 6/2004 | Blendea | |
| 2006/0103204 A1 * | 5/2006 | Walker et al. | 297/284.4 |
| 2010/0066143 A1 * | 3/2010 | Schweizer et al. | 297/284.7 |
| 2010/0078980 A1 * | 4/2010 | Popa | 297/284.7 |
| 2010/0244521 A1 | 9/2010 | Ueda | |
| 2011/0127817 A1 | 6/2011 | Yu et al. | |
| 2014/0125103 A1 * | 5/2014 | Suzuki | 297/284.7 |

FOREIGN PATENT DOCUMENTS

| | | |
|---|---|---|
| CN | 102079260 A | 6/2011 |
| JP | 5-34958 U | 5/1993 |
| JP | H 6-72202 A | 3/1994 |
| JP | 08-205956 A | 8/1996 |
| JP | 2664603 B2 | 10/1997 |
| JP | 10-234511 A | 9/1998 |
| JP | 2006-523105 A | 10/2006 |
| JP | 2010-057824 A | 3/2010 |

OTHER PUBLICATIONS

International Search Report (ISR) (PCT Form PCT/ISA/210), in PCT/JP2012/073260, dated Oct. 30, 2012.

* cited by examiner

LUMBAR SUPPORT APPARATUS

TECHNICAL FIELD

The present invention relates to a lumbar support apparatus that presses a seated person's lumbar spine and supports a correct posture of the seated person.

BACKGROUND ART

A lumbar support apparatus has a curved plate, which is provided to a seat-back frame so that an upper part of the curved plate is rotatable in a vertical direction and which is deformable in a direction along which a seated person's lumbar spine is pressed, a curved-plate deformation-amount adjustment unit, which moves a lower part of the curved plate in the vertical direction and adjusts a deformation amount of the curved plate relative to a seated person's back part, and a drive unit, which drives the curved-plate deformation-amount adjustment unit.

The curved-plate deformation-amount adjustment unit includes a wire, which is arranged to move in the vertical direction and to which the lower part of the curved plate is attached, and a drum, onto which both end portions of the wire are wound. When the drum is rotated, one wire-side is continuously unwound from the drum and the other wire-side is wound onto the drum, so that the wire is moved in the vertical direction and a deformation amount of the curved plate is thus adjusted (for example, refer to Patent Document 1).

CITATION LIST

Patent Literature

Patent Document 1: JP-A-2006-523105

SUMMARY OF INVENTION

Technical Problem

However, a background curved-plate deformation-amount adjustment unit of the lumbar support apparatus is configured by the wire, a guide, which guides the wire in the vertical direction, and the drum, which winds or unwinds the wire, so that a wide attaching space is required. Also, the adjustment unit becomes heavy.

The present invention has been made with consideration of the above problems, and an object of the present invention is to provide a space-saving and lightweight lumbar support apparatus.

Solution to Problem

In order to realize at least one of the above objects, a lumbar support apparatus according to an aspect of the present invention includes a seat-back frame, which supports a seated person's back part; a curved plate, which has one end supported to the seat-back frame and is deformable in a direction along which a seated person's lumbar spine is pressed; a curved-plate deformation-amount adjustment unit including: a threaded rod having an external thread formed on a peripheral surface; and a nut member that is threadedly engaged with the external thread of the threaded rod, wherein one of the threaded rod and the nut member is provided to the seat-back frame so that it is rotatable about a center axis and the other is prohibited from rotating about the center axis, is moveable in a vertical direction and is attached to the other end of the curved plate by an attachment member; and a drive unit which rotates the one member of the threaded rod and the nut member, which is provided to be rotatable about the center axis.

Meanwhile, in the specification, the term 'seat-back frame' includes a seat-back frame itself and also a member that supports a seated person's back side, like the seat-back frame.

Effect of the Invention

According to the present invention, the curved-plate deformation-amount adjustment unit is configured by the threaded rod having an external thread formed on a peripheral surface and the nut member that is threadedly engaged with the external thread of the threaded rod. One of the threaded rod and the nut member is provided to the seat-back frame so that it is rotatable about a center axis. The other is prohibited from rotating about a center axis, is moveable in the vertical direction and is attached to the other end of the curved plate by the attachment member. Thereby, the adjustment unit saves a space and is lightweight.

The other effects of the present invention will be more clarified from illustrative embodiments of the present invention and the accompanying drawings, as described below.

ILLUSTRATIVE EMBODIMENTS OF THE PRESENT INVENTION

First Illustrative Embodiment

Figure 1:
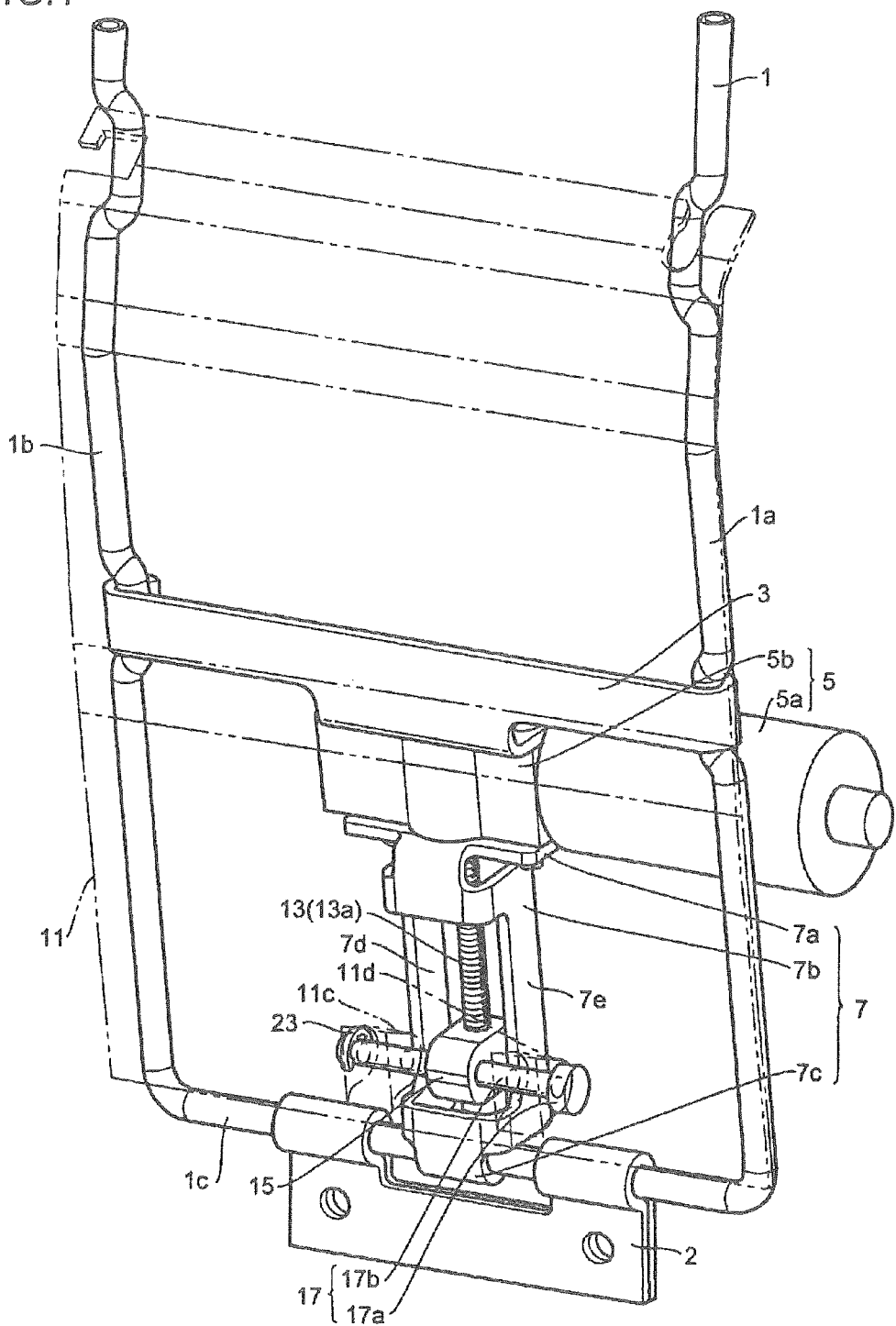
FIG. 1 is a perspective view of a lumbar support apparatus, in which a curved plate is omitted, according to a first illustrative embodiment of the present invention, as seen from a front-side of a seat.
Figure 2:
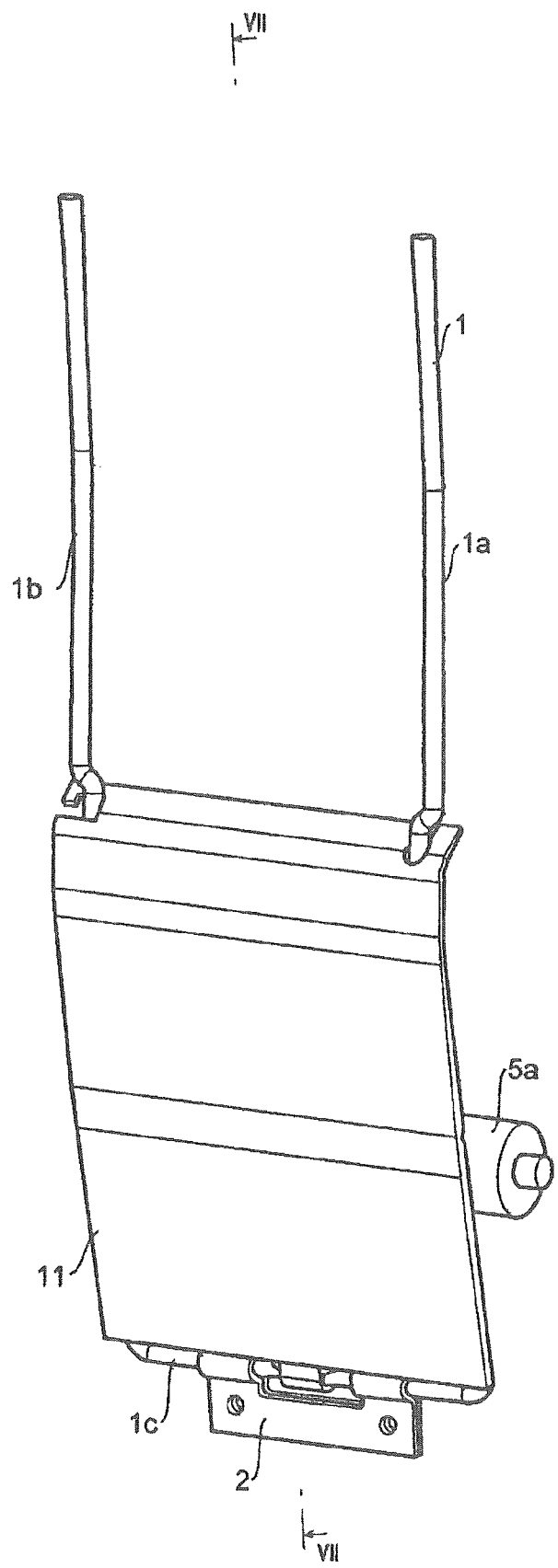
FIG. 2 is a perspective view of the lumbar support apparatus, in which a curved plate is attached to the apparatus of FIG. 1, as seen from the front-side of the seat.
Figure 3:
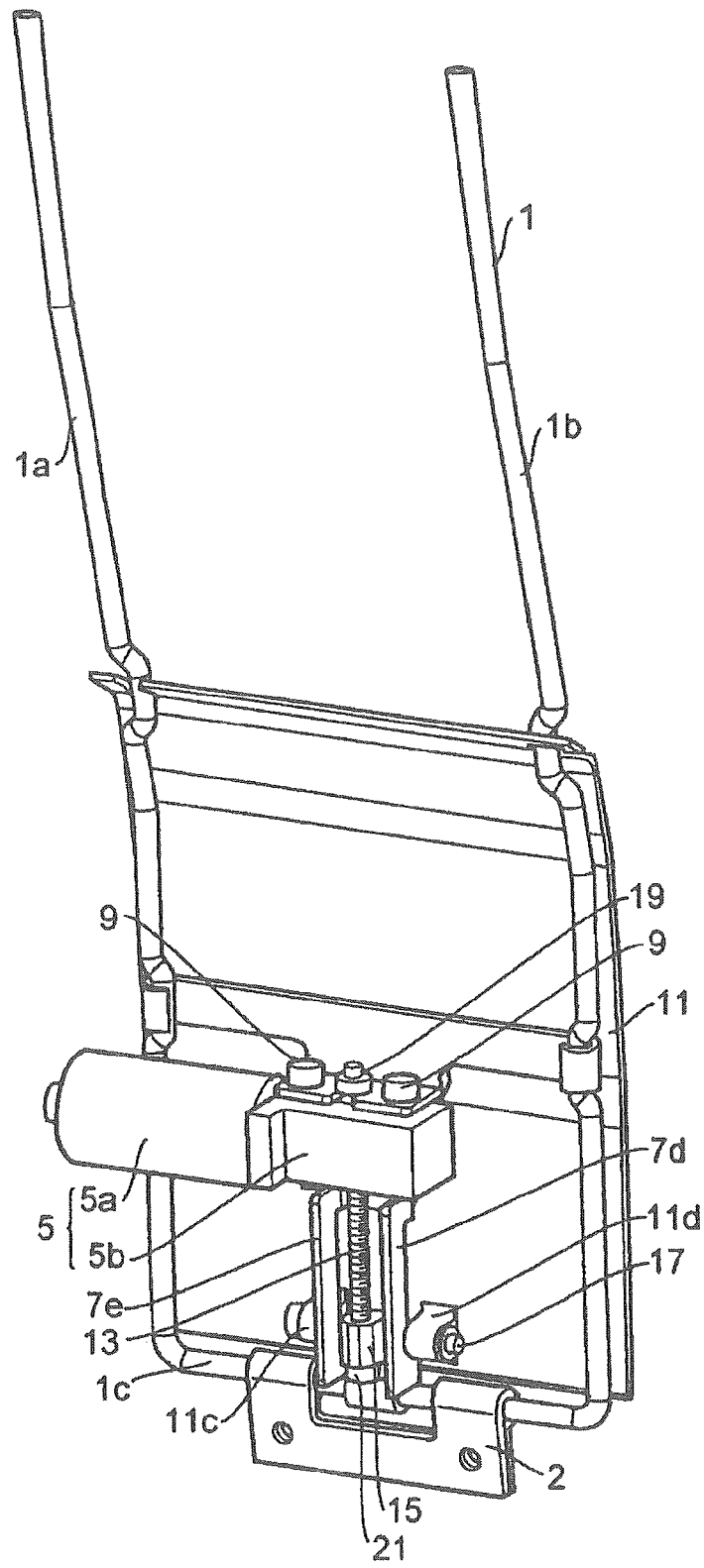
FIG. 3 is a perspective view of the lumbar support apparatus shown in FIG. 2, as seen from a back-side of the seat.
Figure 4:
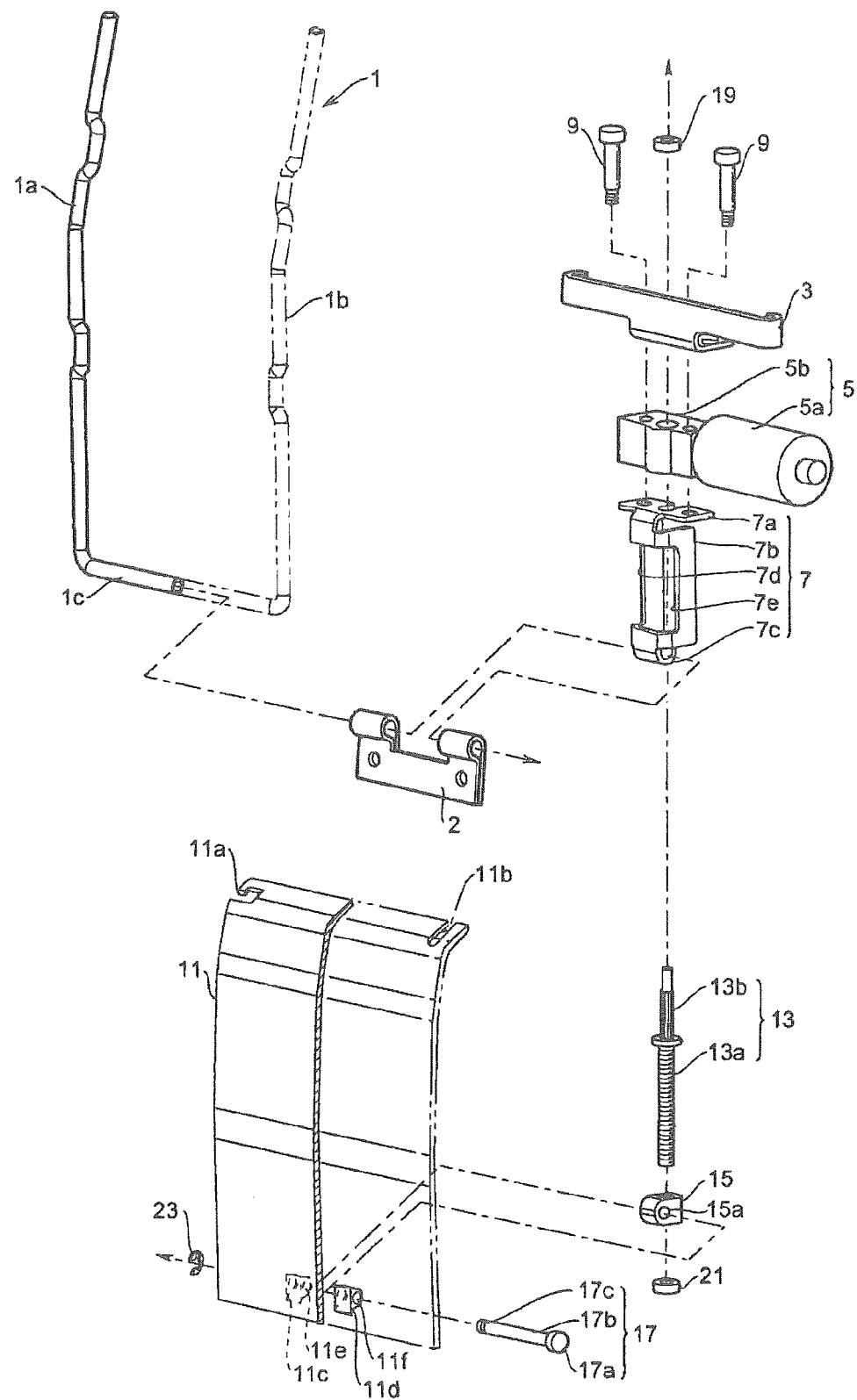
FIG. 4 is an exploded perspective view of the lumbar support apparatus shown in FIG. 2.
Figure 5:
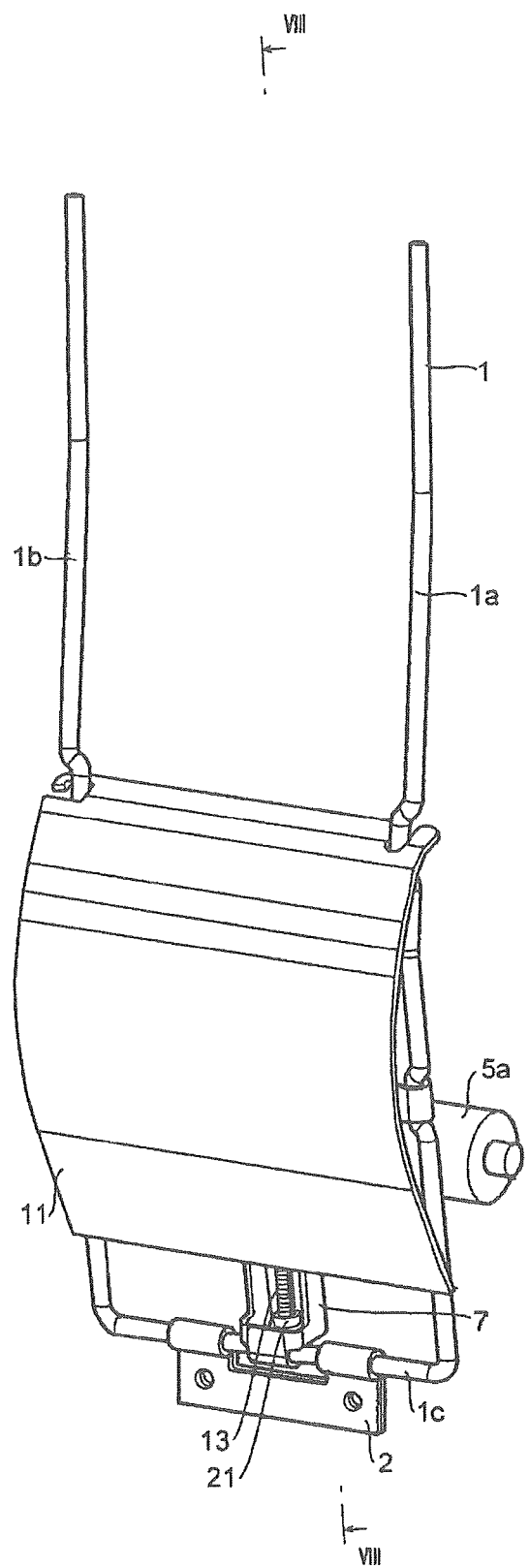
FIG. 5 illustrates an operation of the lumbar support apparatus shown in FIG. 2.
Figure 6:
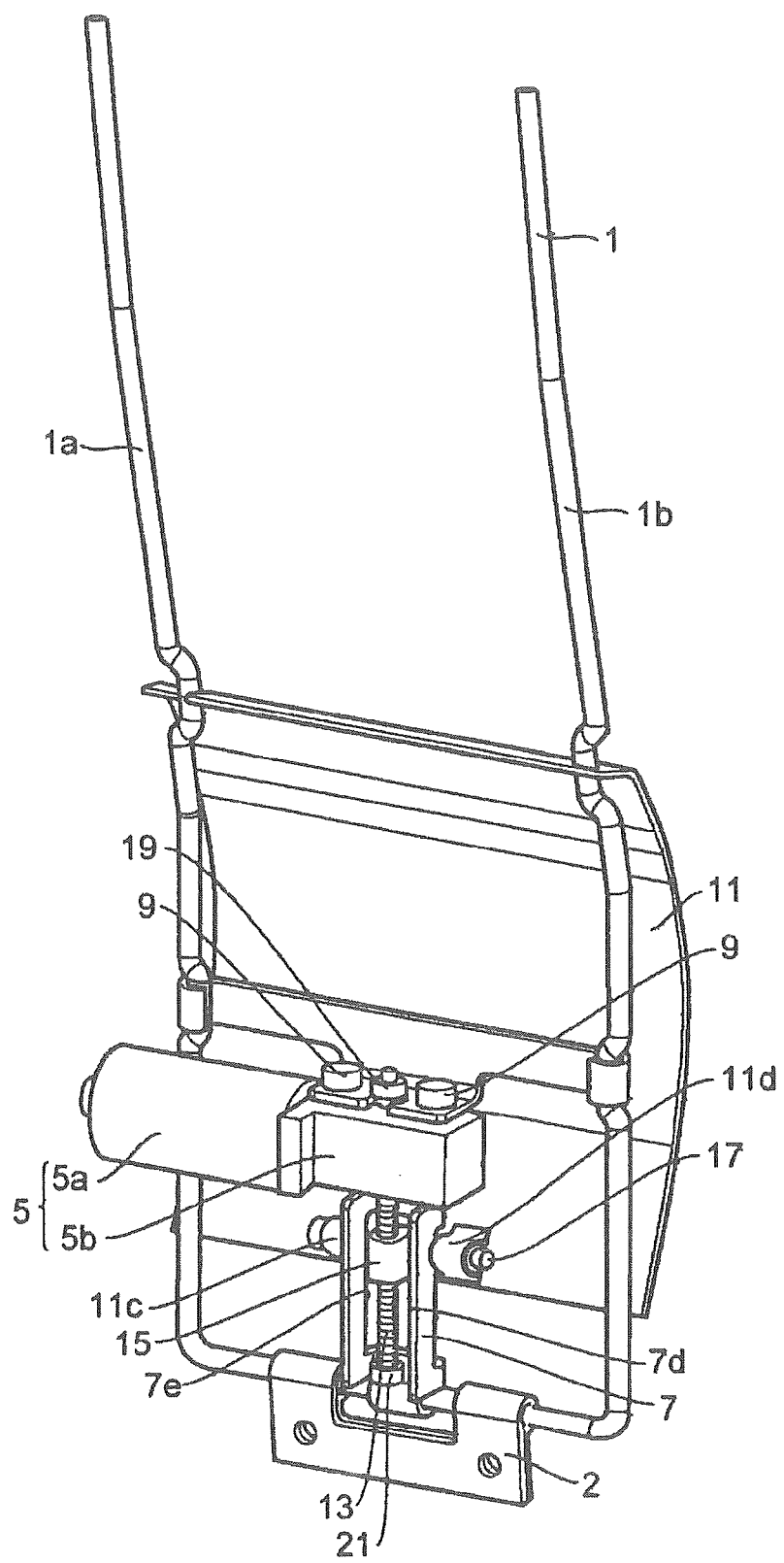
FIG. 6 illustrates an operation of the lumbar support apparatus shown in FIG. 3.
Figure 7:
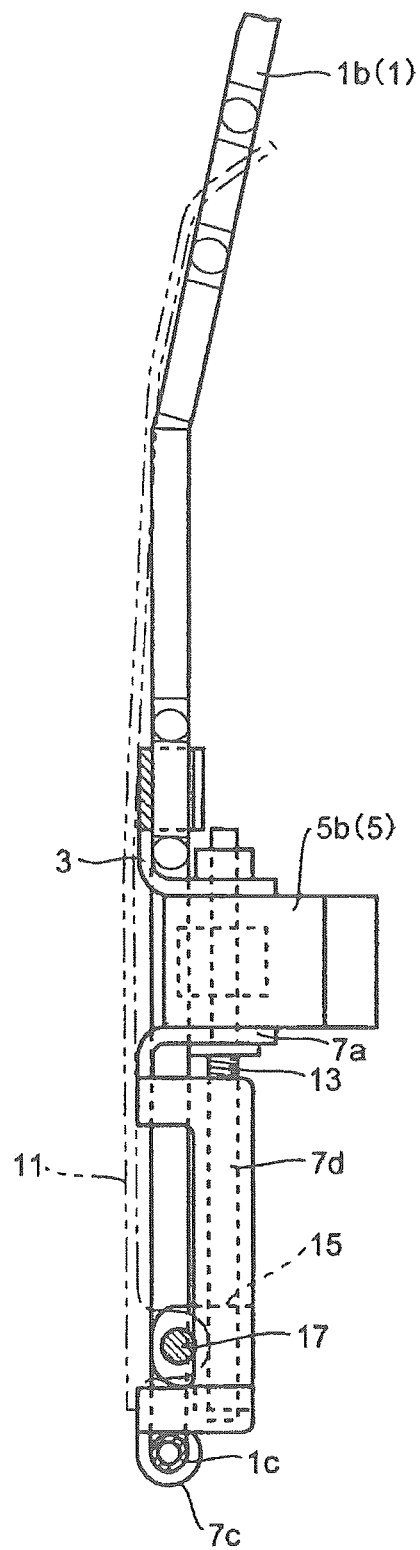
FIG. 7 is a sectional view taken along a line VII-VII of FIG. 2.
Figure 8:
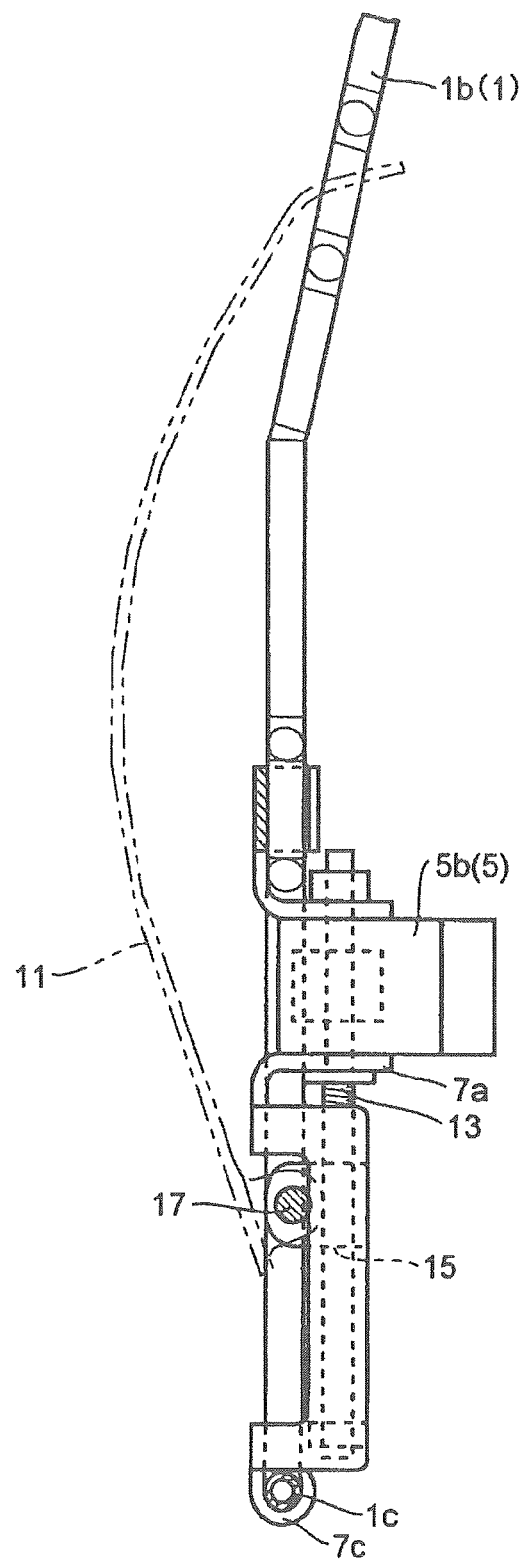
FIG. 8 is a sectional view taken along a line VIII-VIII of FIG. 5.

It will be described with reference to FIGS. 1 to 8. FIG. 1 is a perspective view of a lumbar support apparatus, in which a curved plate is omitted, according to a first illustrative embodiment of the present invention, as seen from a front-side of a seat, FIG. 2 is a perspective view of the lumbar support apparatus, in which a curved plate is attached to FIG. 1, as seen from the front-side of the seat, FIG. 3 is a perspective view of the lumbar support apparatus shown in FIG. 2, as seen from a back-side of the seat, FIG. 4 is an exploded perspective view of the lumbar support apparatus shown in FIG. 2, FIG. 5 illustrates an operation of the lumbar support apparatus shown in FIG. 2, FIG. 6 illustrates an operation of the lumbar support apparatus shown in FIG. 3, FIG. 7 is a left side view of FIG. 2, and FIG. 8 is a left side view of FIG. 5.

First, a configuration of a lumbar support apparatus of this illustrative embodiment is described with reference to FIGS. 1 to 4 and FIG. 7.

A seat-back frame 1 supporting a seated person's back part has a pair of side parts 1a, 1b that is provided in a vertical direction. Also, the seat-back frame has a bottom part 1c that bridges a lower part of the side part 1a and a lower part of the side part 1b. The bottom part 1c is provided with a bracket 2 for connecting the seat-back frame 1 to another structure member of the side of the seat back.

A motor bracket 3 is provided between the side part 1a and the side part 1b of the seat-back frame 1. A motor unit 5 serving as a driving source and a load supporting bracket 7 are attached to the motor bracket 3 by using bolts 9. The motor unit 5 has a motor main body 5a and a deceleration device 5b integrated with the motor main body 5a. Also, in this illustrative embodiment, the load supporting bracket 7 is formed by bending a metal plate and has a motor unit attaching part 7a attached to a bottom part of the motor unit 5, a load supporting part 7b, which is connected to the motor unit attaching part 7a and has a C-shaped section in a horizontal direction, and a seat-back frame attaching part 7c, which is connected to the load supporting part 7b and is attached to the bottom part 1c of the seat-back frame 1.

The load supporting part 7b has a first load supporting part 7d and a second load supporting part 7e, which face each other. End faces of the first load supporting part 7d and the second load supporting part 7e, which face the seated person's back part, are rod abutting faces on which both end portions of a rod (which will be described later) can abut.

A curved plate 11 that is deformable in a direction along which a seated person's lumbar spine is pressed is arranged between the seat-back frame 1 and the seated person's back part. One side of an upper part (one end) of the curved plate 11 is formed with an L-shaped slot 11a that is engaged with the side part 1a from the side portion. The other side of the upper part of the curved plate 11 is formed with a slot 11b that is engaged with the side part 11b from the front. By the engagements of the slot 11a and the slot 11b, the upper part of the curved plate 11 is supported to the seat-back frame 1 (it is prohibited from ascending and descending).

A center of a lower part (the other end) of the side of the seat-back frame of the curved plate 11 is provided with protrusions 11c and 11d in parallel. The protrusions 11c and 11d are formed with through-holes 11e and 11f that are coaxial in the horizontal direction.

A threaded rod 13 is attached to an output-side of the deceleration device 5b of the motor unit 5. The threaded rod 13 has a threaded rod main body 13a having an external thread formed on a peripheral surface thereof and an attachment part 13b that has a serration formed on a peripheral surface and is attached to the output-side of the deceleration device 5b. The threaded rod main body 13a of the threaded rod 13 is arranged in a space between the first load supporting part 7d and second load supporting part 7e of the load supporting part 7b of the load supporting bracket 7. The external thread of the threaded rod main body 13a of the threaded rod 13 is threadedly engaged with a nut member 15. The nut member 15 abuts on inner wall surfaces of the first load supporting part 7d and second load supporting part 7e of the load supporting part 7b of the load supporting bracket 7 and is thus prohibited from rotating about a center axis. In the meantime, an upper end-side of the attachment part 13b of the threaded rod 13 is provided with a stopper 19 that prevents the threaded rod 13 from being separated from the deceleration device 5b of the motor unit 5. Also, a lower end of the threaded rod main body 13a of the threaded rod 13 is provided with a stopper 21 on which the nut member 15 can abut.

The nut member 15 is formed with a horizontal through-hole 15a. The nut member 15 is attached to the lower part of the curved plate 11 by a rod (attachment member) 17 that is inserted into the through-hole 11f of the protrusion 11d of the curved plate 11, the through-hole 15a of the nut member 15 and the through-hole 11e of the protrusion 11c of the curved plate 11 and can abut on the end faces of the first load supporting part 7d and second load supporting part 7e of the load supporting part 7b of the load supporting bracket 7, which face the seated person's back part. In the meantime, the rod 17 has a head part 17a having a diameter larger than a diameter of the through-hole 11f of the protrusion 11d of the curved plate 11 and a neck part 17b having a diameter smaller than those of the through-hole 11f of the protrusion 11d of the curved plate 11, the through-hole 15a of the nut member 15, and the through-hole 11e of the protrusion 11c of the curved plate 11. A peripheral surface of a tip-side of the neck part 17b is formed with a circumferential groove 17c that is engaged with an E-ring 23 for separation prohibition.

Subsequently, operations of the above configuration are described.

FIGS. 2, 3 and 7 show a state where the nut member 15 is located at the lower of the threaded rod 13 and the curved plate 11 is not substantially deformed in the direction along which the seated person's lumbar spine is pressed.

From the above state, when the motor unit 5 is rotated in one direction, the threaded rod 13 is rotated. Since the nut member 15 threadedly engaged with the threaded rod 13 is prohibited from rotating about the center axis, the nut member ascends along the threaded rod 13. Since the nut member 15 is attached to the lower part of the curved plate 11 via the rod 17, the lower part of the curved plate 11 also ascends. Since the upper part of the curved plate 11 is prohibited from ascending and descending, the curved plate 11 is deformed in the direction along which the seated person's lumbar spine is pressed, as shown in FIGS. 5, 6 and 8. At this time, a force applied to the curved plate 11 from the seated person's back part is transmitted from the rod 17 to the seat-back frame 1 via the first load supporting part 7d and second load supporting part 7e of the load supporting part 7b of the load supporting bracket 7.

The threaded rod 13, the nut member 15 and the first load supporting part 7d and second load supporting part 7e of the bracket 7 prohibiting the nut member 15 from rotating about the center axis configure a curved-plate deformation-amount adjustment unit that adjusts a deformation amount of the curved plate 11.

Also, when the motor unit 5 is rotated in the other direction from the state shown in FIGS. 5, 6 and 8, the nut member 15 descends along the threaded rod 13, and the deformation amount of the curved plate 11 in the direction along which the seated person's lumbar spine is pressed is reduced.

According to the above configuration, following effects can be obtained.

(1) The curved-plate deformation-amount adjustment unit that adjusts a deformation amount of the curved plate 11 is configured by the threaded rod 13, the nut member 15 and the first load supporting part 7d and second load supporting part 7e, which prohibits the nut member 15 from rotating about the center axis, of the bracket 7. Thereby, the lumbar support apparatus becomes space-saving and light.

(2) The nut member 15 is prohibited from rotating about the center axis by the first load supporting part 7d and second load supporting part 7e of the bracket 7 to which the load from the rod 17 is applied. Thereby, the lumbar support apparatus becomes space-saving and light.

(3) The load from the rod 17 is supported at the two portions of the first load supporting part 7d and second load supporting part 7e of the bracket 7. Therefore, even when high load is transmitted from the rod 17, the threaded rod 13 is not damaged well. Also, since the load is supported at the two portions, it is possible to suppress generation of moment of the rod 17.

Second Illustrative Embodiment

Figure 9:
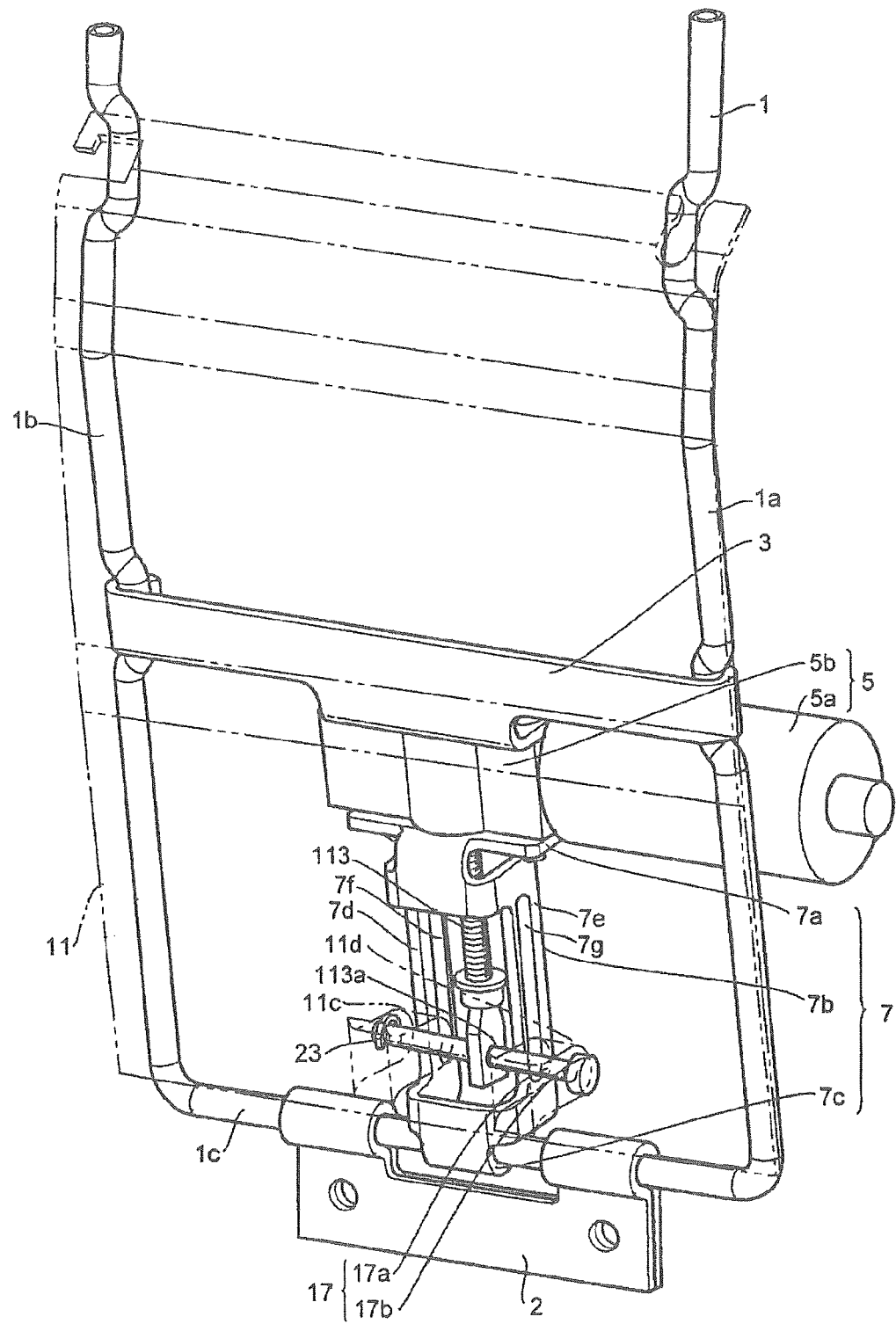
FIG. 9 is a perspective view of a lumbar support apparatus, in which the curved plate is omitted, according to a second illustrative embodiment of the present invention, as seen from the front-side of the seat.
Figure 10:
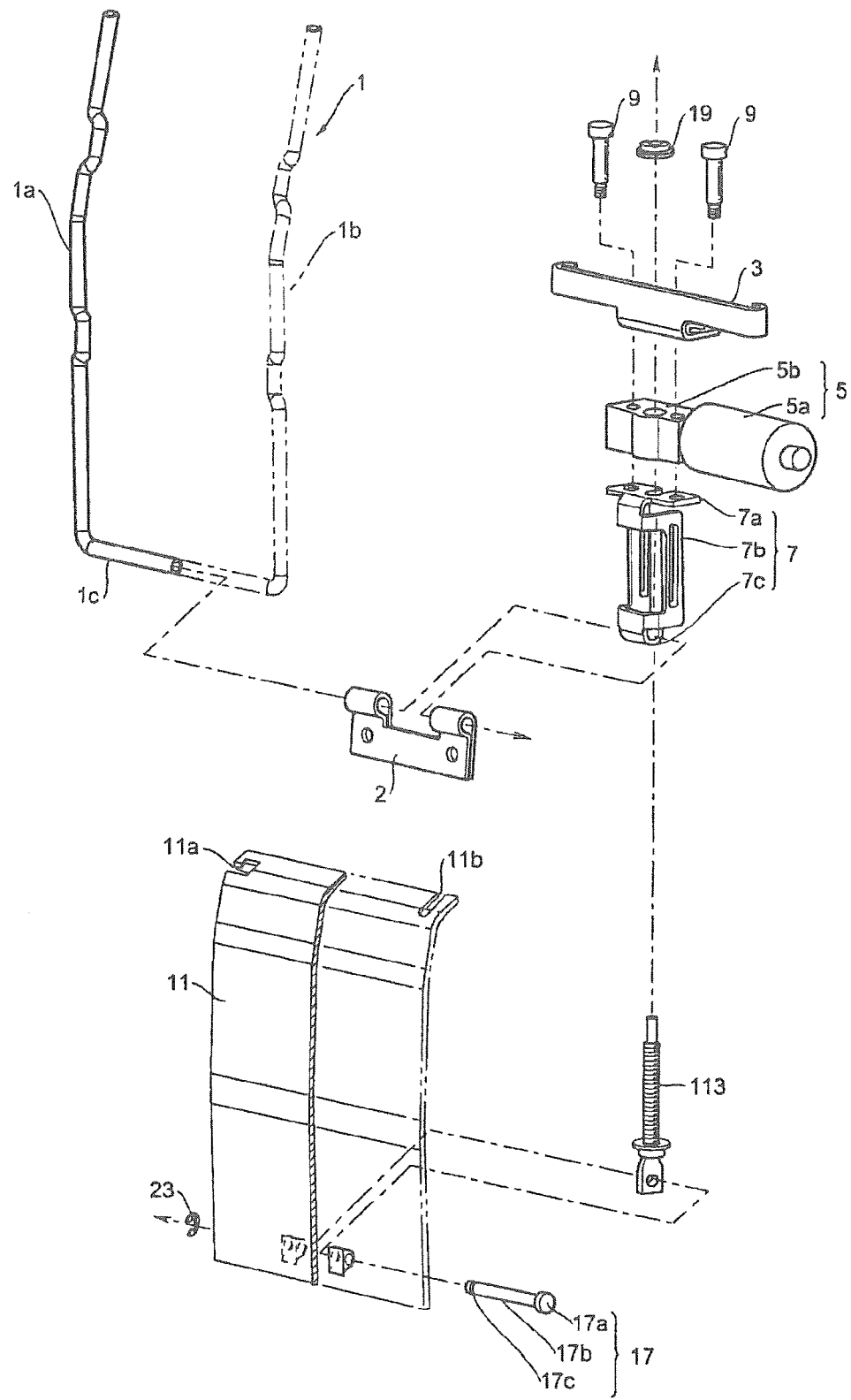
FIG. 10 is an exploded perspective view of the lumbar support apparatus shown in FIG. 9.

It is described with reference to FIG. 9. This illustrative embodiment is different from the first illustrative embodiment with respect to the curved-plate deformation-amount adjustment unit and the structure of supporting the load of the rod, and the other configurations are the same. Accordingly, the same parts as those of the first illustrative embodiment are denoted with the same reference numerals and the overlapping descriptions are omitted. FIG. 9 is a perspective view of a lumbar support apparatus, in which the curved plate is omitted, according to the second illustrative embodiment, as seen from the front-side of the seat.

In this illustrative embodiment, the first load supporting part 7d and second load supporting part 7e, which face each other, in the load supporting part 7b of the load supporting bracket 7 are formed with vertical slits 7f and 7g. Both end portions of the rod 17 are inserted into the slits 7f and 7g, and the rod 17 can abut on inner wall surfaces of the slits 7f and 7g, which are parallel to the seated person's back part.

Also, the curved-plate deformation-amount adjustment unit of this illustrative embodiment is configured by a nut member (not shown) that is rotated in the deceleration device 5b and a threaded rod 113 that is threadedly engaged with the nut member and is formed with a hole 113a into which the rod 17 is inserted at a lower part thereof. Since the rod 17 is inserted into the slits 7f and 7g of the bracket 7, it is prohibited from rotating a rotational axis.

When the motor unit 5 is rotated in one direction, the nut member (not shown) is rotated. Since the threaded rod 113 threadedly engaged with the nut member is prohibited from rotating about the center axis, the threaded rod ascends along the slits 7f and 7g. Since the threaded rod 113 is attached to the lower part of the curved plate 11 through the rod 17, the lower part of the curved plate 11 also ascends and the curved plate 11 is deformed in the direction along which the seated person's lumbar spine is pressed. At this time, the force that is applied to the curved plate 11 from the seated person's back part is transmitted from the rod 17 to the seat-back frame 1 via the inner wall surfaces of the slits 7f, 7g of the first load supporting part 7d and second load supporting part 7e of the load supporting part 7b of the load supporting bracket 7, which face the seated person's back part.

Also, when the motor unit 5 is rotated in the other direction, the threaded rod 113 descends along the slits 7f and 7g, and the deformation amount of the curved plate 11 in the direction along which the seated person's lumbar spine is pressed is reduced.

According to the above configuration, following effects can be obtained.

(1) The curved-plate deformation-amount adjustment unit that adjusts a deformation amount of the curved plate 11 is configured by the nut member and the slits 7f and 7g of the first load supporting part 7d and second load supporting part 7e of the bracket 7 prohibiting the threaded rod 113 from rotating about the center axis. Thereby, the lumbar support apparatus becomes space-saving and light.

(2) The threaded rod 113 is prohibited from rotating about the center axis by the slits 7f and 7g of the first load supporting part 7d and second load supporting part 7e of the load supporting bracket 7 to which the load from the rod 17 is applied, and the rod 17. Thereby, the lumbar support apparatus becomes space-saving and light.

(3) The load from the rod 17 is supported at the two portions of the slits 7f and 7g of the first load supporting part 7d and second load supporting part 7e of the bracket 7. Therefore, even when the high load is transmitted from the rod 17, the threaded rod 113 is not damaged well. Also, since the load is supported at the two portions, it is possible to suppress generation of moment of the rod 17.

In the meantime, the present invention is not limited to the two illustrative embodiments. For example, the two illustrative embodiments are driven by the motor but may be manually driven.

Also, in the two illustrative embodiments, the upper part of the curved plate 11 is rotatably provided to the seat-back frame 1 and the curved-plate deformation-amount adjustment unit is provided at the lower part of the curved plate 11. To the contrary, the lower part of the curved plate 11 may be rotatably provided to the seat-back frame 1 and the curved-plate deformation-amount adjustment unit may be provided at the upper part of the curved plate 11.

DESCRIPTION OF THE REFERENCE NUMERALS

1: seat-back frame
5: drive unit
11: curved plate
13: threaded rod
15: nut

The invention claimed is:
1. A lumbar support apparatus, comprising:
a seat-back frame, which supports a seated person's back part;
a curved plate, which includes one end supported to the seat-back frame and is deformable in a direction along which a seated person's lumbar spine is pressed;
a curved-plate deformation-amount adjustment unit including:
a threaded rod including an external thread formed on a peripheral surface; and
a nut member that is threadedly engaged with the external thread of the threaded rod,
wherein one of the threaded rod and the nut member is provided to the seat-back frame so that it is rotatable about a center axis and an other of the threaded rod and the nut member is prohibited from rotating about the center axis, is moveable in a vertical direction, and is attached to an other end of the curved plate by an attachment member; and
a drive unit which rotates the one of the threaded rod and the nut member, which is provided to be rotatable about the center axis,
wherein the other end of the curved plate is moveable in the vertical direction toward the one end of the curved plate.
2. The lumbar support apparatus according to claim 1, further comprising a load supporting bracket that is provided to the seat-back frame, on which the attachment member abuts and which supports a load to be applied to the attachment member.

3. The lumbar support apparatus according to claim 2, wherein the load supporting bracket is capable of supporting the attachment member, at least at two portions.

4. The lumbar support apparatus according to claim 2, wherein the load supporting bracket includes a slit into which the attachment member is inserted.

5. The lumbar support apparatus according to claim 1, wherein the attachment member is provided on the other of the threaded rod and the nut member, and
wherein the other end of the curved plate is pivotably coupled to the attachment member.

6. The lumbar support apparatus according to claim 1, wherein the curved-plate deformation-amount adjustment unit is accommodated in the seat-back frame.

7. The lumbar support apparatus according to claim 1, wherein the other end of the curved plate is coupled to the attachment member at both sides with respect to the threaded rod, in a lateral direction.

* * * * *